(12) United States Patent
Watanabe

(10) Patent No.: US 9,452,471 B2
(45) Date of Patent: Sep. 27, 2016

(54) BUSHING DEVICE, WATER-COMMUNICATING MECHANISM AND A METHOD OF MAKING THE WATER-COMMUNICATING MECHANISM

(76) Inventor: Kayo Watanabe, Kyoto (JP)

(\*) Notice: Subject to any disclaimer, the term of this patent is extended or adjusted under 35 U.S.C. 154(b) by 267 days.

(21) Appl. No.: 14/126,110

(22) PCT Filed: Jun. 12, 2012

(86) PCT No.: PCT/JP2012/065041
§ 371 (c)(1),
(2), (4) Date: Feb. 10, 2014

(87) PCT Pub. No.: WO2012/173124
PCT Pub. Date: Dec. 20, 2012

(65) Prior Publication Data
US 2014/0174690 A1 Jun. 26, 2014

(30) Foreign Application Priority Data

Jun. 15, 2011 (JP) .................. 2011-133086
May 19, 2012 (JP) .................. 2012-115141

(51) Int. Cl.
*B22D 17/22* (2006.01)
*B22C 9/06* (2006.01)
*B29C 33/04* (2006.01)

(52) U.S. Cl.
CPC ........... *B22D 17/2218* (2013.01); *B22C 9/065* (2013.01); *B29C 33/04* (2013.01); *B29K 2995/0013* (2013.01); *Y10T 29/49908* (2015.01)

(58) Field of Classification Search
CPC .... B22D 17/22; B22D 17/2218; B22C 9/065
USPC ........................................... 164/348
See application file for complete search history.

(56) References Cited

FOREIGN PATENT DOCUMENTS

| CN | 2378175 Y | 5/2000 |
|---|---|---|
| CN | 1294546 A | 5/2001 |
| CN | 1392808 A | 1/2003 |
| CN | 201456359 U | 5/2010 |

(Continued)

OTHER PUBLICATIONS

International Search Report issued in corresponding International Patent Application No. PCT/JP2012/065041 dated Aug. 21, 2012.

(Continued)

*Primary Examiner* — Kevin P Kerns
(74) *Attorney, Agent, or Firm* — Morgan, Lewis & Bockius LLP

(57) ABSTRACT

Provided is a bushing device capable of improving a tight-fitting structure in which a bushing is tightly pushed into a water-communicating hole. A bushing collar is placed between the bushing and an inner wall of the water-communicating hole. An outer surface of the bushing is tapered, and an inner surface of the bushing collar is tapered in accordance with the outer surface of the bushing. When the bushing is secured to the water-communicating hole, the bushing collar is tightly fit into the water-communicating hole as a result of the wedge-shaped effect exerted between the tapered surfaces of the bushing and the bushing collar. Since the tapered surface of the bushing and the bushing collar are tightly fit, it is possible to significantly improve a heat-conductive efficiency between the bushing and the bushing collar, and reducing procedures needed to exchange casings with a good usability.

16 Claims, 17 Drawing Sheets

(56) References Cited

FOREIGN PATENT DOCUMENTS

| JP | 09-29416 A | 2/1997 |
| JP | 09-296826 A | 11/1997 |
| JP | 11-156520 A | 6/1999 |
| JP | 11-170025 A | 6/1999 |
| JP | 2000-337379 A | 12/2000 |
| JP | 2006-289382 A | 10/2006 |
| JP | 2009-195914 A | 9/2009 |
| JP | 2010-240695 A | 10/2010 |
| JP | 2011-025262 A | 2/2011 |

OTHER PUBLICATIONS

Extended European Search Report issued in corresponding European Patent Application No. 12799739.3 dated Oct. 23, 2014.
Office Action issued in corresponding Japanese Patent Application No. 2012-115141 dated Nov. 12, 2013.
Office Action issued in corresponding Korean Patent Application No. 10-2013-7027497 dated Feb. 23, 2015.
European Office Action issued in European Patent Application No. 12 799 7393 on Dec. 1, 2015.

BUSHING DEVICE, WATER-COMMUNICATING MECHANISM AND A METHOD OF MAKING THE WATER-COMMUNICATING MECHANISM

BACKGROUND OF THE INVENTION

Field of the Invention

The present invention relates to a bushing device, a water-communicating mechanism and a method of making the water-communicating mechanism in which an aqueous medium (coolant) is supplied to a water-communicating hole (cooling hole) which is formed on a device body or a metal die to cool the device body or the metal die.

In a first prior art reference (Japanese Laid-open Patent Application No. 2006-289382), disclosed is a metal die cooling structure and a method of making the metal die cooling structure in which a heat-conductive layer is provided between a casing inserted into a cooling hole and an inner wall of the cooling hole. The heat-conductive layer is filled with a molten metal (referred to as a filler metal hereinafter) having a low melting temperature.

More specific, a soldering material (alloyed metal having a low melting temperature) is provided between an outer surface of the casing and an inner surface of the cooling hole so as to obviate an air clearance therebetween. After the alloyed metal is cooled and solidified, the alloyed metal resultantly fixes the casing within the cooling hole (refer to paragraph [0012]).

In a second prior art reference (Japanese Laid-open Patent Application No. 09-29416), disclosed is a molten-metal cooling pin used for a metal die in which an inner cylinder and an outer cylinder are provided in a double cylinder structure within a molten-metal cooling portion of the metal die.

More particularly, the outer cylinder is made of an alloy tool steel, and the inner cylinder is made of a copper-based alloy or a stainless steel.

In this instance, the inner cylinder is press fit into the outer cylinder through their inner and outer surfaces by means of a shrinkage-fit or cooling-fit procedure (refer to paragraph [0007]).

The second prior art reference also discloses a tight-fitting heat-conductive layer in which a molten metal is solidified after the molten metal is poured into the air clearance between the inner cylinder and the outer cylinder.

In general, since the metal die has a cavity into which the molten metal (e.g., molten aluminum) is poured, the metal die is subjected to a thermal shock due to an abrupt temperature rise. On the other hand, the metal die is subjected to a quick temperature drop caused by an evaporation heat of a separable agent applied to the metal die before separating a female die from a male die. This may cause numerous cracks (referred also to as "die cracks" hereinafter) appeared on the cavity of the metal die.

The cooling hole formed on the metal die collects a cooling medium (e.g., cooling water) which causes a rust appeared to erode the metal die. The rust together with the thermal shock facilitates to further develop the die cracks. When the die cracks develop such a degree as to communicate with the cavity, products which are made by pouring the molten metal into the cavity deteriorate their quality to an unacceptable level.

In order to prevent the cracks from occurring on the cavity, the casing and the inner cylinder (equivalent to the internal lining) are provided as mentioned in the first and second prior art references.

In the first prior art reference in which the molten metal is poured into the cooling hole to improve the tight-fitting structure between the casing and the cooling hole, it requires a heating procedure to heat the metal die at a temperature (e.g., 600° C.) more than the filler metal can melt when the filler metal is taken out of the metal die upon exchanging the casings (refer to paragraph [0019]). Namely, it is necessary to implement the procedure to melt and solidify a proper amount of the filler metal so as to obviate the air clearance, thereby making the procedure laborious and time-consuming (not user-friendly).

Upon implementing the maintenance of removing strains from the metal die, there would be a risk at the time of heating the filler metal that the filler metal will be molten to release the tight-fitting structure between the casing and the cooling hole. When the casing tightly engages against the inner wall of the cooling hole, there is a possibility of developing the die cracks and the casing being partly broken to resultantly lose the function of the internal lining.

The second prior art reference which is represented by the tight-fitting heat-conductive layer in the molten-metal cooling pin used for the metal die, has the same problems as mentioned in the first prior art reference.

The second prior art reference discloses a simplified structure in which the inner cylinder (made by a copper-based alloy or stainless steel) is press fit into the outer cylinder. Due to the spring-back phenomenon when press fitting the inner cylinder into the outer cylinder with an elastic deformation accompanied, there would be a possibility that the inner cylinder will not completely engage with the outer cylinder, which causes to reduce a heat-conductive efficiency between the two cylinders. This makes it difficult to favorably control the temperature of the metal die when cooling the metal die.

Therefore, the present invention has been made with the above drawbacks in mind, it is a main object of the invention to provide a bushing device, a water-communicating mechanism and a method of making the water-communicating mechanism which are capable of achieving a tight-fitting structure between a device body and an inner wall of a water-communicating hole with a simplified structure.

SUMMARY OF THE INVENTION

According to the present invention, there is provided a bushing device in which a bushing is provided on a device body to be in communication with a water-communicating hole, so that an aqueous medium is supplied to the bushing.

A bushing collar is placed between the bushing and an inner wall of the water-communicating hole, and a diametrical dimension of the bushing collar is arranged to be identical to a diameter of the water-communicating hole when the bushing is secured to the water-communicating hole. An outer surface of the bushing is tapered, and an inner surface of the bushing collar is tapered in accordance with the outer surface of the bushing.

The device body categorically includes the metal die, an engine and the equivalents. The metal die categorically includes a molten-metal cooling pin (e.g., the outer cylinder in the prior art) which directly comes in contact with molten metal. This is because the molten-metal cooling pin has a cooling hole to constitute a part of the metal die upon implementing the die-casting procedure.

Namely, the bushing device may be inserted into the cooling hole defined on the molten-metal cooling pin. The metal die categorically includes a molten-metal pouring device placed on a stationary side of the metal die and a sub-flowing device placed on a movable side of the metal die. Namely, the bushing device may be inserted into the cooling hole provided on the metal die or the sub-flowing device.

According to other aspect of the invention, the bushing device has the bushing collar formed by a material which is higher in thermal conductivity and ductility compared to a ferrous steel. It is preferable to select the material from aluminum, copper and the equivalents.

According to other aspect of the invention, the bushing collar is divided into a plurality of collar parts cut along a longitudinal direction.

More specific, the bushing collar is longitudinally cut at a maximum diameter of the bushing collar to make divided parts readily insert into the water-communicating hole. Plurality means more than two elements, and the bushing collar may be divided into three or four parts. The divided parts may be bonded at their front ends by means of a welding procedure.

According to other aspect of the invention, the bushing collar is formed to have notched portions extended from a basal portion to a proximity of a front end portion of the bushing collar, and the front end portion is formed into a thinned or notched configuration.

According to other aspect of the invention, the bushing has a cylindrical body and a flange portion secured to an open-ended portion of the cylindrical body by means of a welding procedure such as, for example, a brazing or soldering procedure. The cylindrical body may be formed integral with the flange portion by means of the metal die.

According to other aspect of the invention, the bushing has a cylindrical body and a flange portion. The flange portion is removably mounted on an open-ended portion of the cylindrical body. The flange portion may be removably mounted on the cylindrical body through a hermetic sealing means such as, for example, a sealant, O-ring or screw.

According to other aspect of the invention, a hooking means is mounted on the open-ended portion of the cylindrical body. The hooking means is represented by a screw by way of illustration.

According to other aspect of the invention, a deformable filler is provided between the bushing and the water-communicating hole. The deformable filler is represented by a metallic paste such as, for example, metallic fibers, zinc or the equivalents. The deformation categorically includes phenomena when the metallic fiber plastically deforms, and the metallic paste flows.

According to other aspect of the invention, there is provided a water-communicating mechanism in which a bushing is provided on a device body to be in communication with a water-communicating hole, so that an aqueous medium is supplied to the bushing. The bushing has an outer surface tapered. A bushing collar has an inner surface tapered in accordance with the outer surface of the bushing, and placed between the bushing and the water-communicating hole. A diametrical dimension of the bushing collar is arranged to be identical to a diameter of the water-communicating hole after the bushing is secured to the water-communicating hole. A water-communicating means is secured to the bushing to continuously supply an aqueous medium to the bushing.

According to other aspect of the invention, a first deformable filler is provided between the bushing and an inner wall of the water-communicating hole, or a second deformable filler is provided between the bushing and the bushing collar.

The first deformable filler and the second deformable filler may be appropriately inserted into the air clearance casually appeared on the metal die.

According other aspect of the invention, there is provided a method of making a water-communicating mechanism in which a bushing is provided on a device body to be in communication with a water-communicating hole, so that an aqueous medium is supplied to the bushing. A bushing collar is inserted into the water-communicating hole. An inner surface of the bush collar is tapered, and a diametrical dimension of the bushing collar is identical to a diameter of the water-communicating hole. The bushing collar is inserted into the bushing. The bushing has an outer surface tapered in accordance with the inner surface of the bush collar. The bushing is pushed into the water-communicating hole by a predetermined depth so that the bushing collar is tightly fit against an inner wall of the water-communicating hole.

According to other aspect of the invention, a water-communicating means is provided after the end of the tightly pushing step so as to continuously supply an aqueous medium to the bushing, and a water-communicating step is further provided to form a communication passage by means of the water-communicating means.

The water-communicating step signifies a procedure of connecting a water source (e.g., a faucet of waterworks) through the water-communicating means. Alternatively, the water-communicating step signifies a procedure of flowing a heat-exchanged water to an exhaust basin so as to form a water flow passage (equivalent to a cooling circuit).

According other aspect of the invention, at least either one of a first filling step before the end of inserting the bushing collar, or a second filling step is provided before the end of inserting the bushing. A first deformable filler is inserted at the first filling step, and a second deformable filler is inserted at the second filling step.

Such is the structure that the bushing is pushed into the water-communicating hole by a predetermined depth so that the bushing collar is spread to tightly fit against an inner wall of the water-communicating hole. Due to the wedge-shaped effect of tapered surface in which the bushing pushes to spread the bushing collar, the bushing collar is brought to interpose between the bushing and the water-communicating hole with the bushing collar tightly engaged with the inner wall of the water-communicating hole. The bushing collar serves as an internal lining, and the bushing collar positively isolates the bushing from the inner wall of the water-communicating hole.

With a combination structure in which the bushing makes its tapered surface fit with the tapered surface of the bushing collar, it becomes possible to tightly engage the bushing with the inner wall of the water-communicating hole through the bushing collar. This makes it possible to control the temperature of the device body (e.g., metal die) without losing a high heat-conductive efficiency.

With a simplified mechanical structure in which the bushing makes its tapered surface fit with the tapered surface of the bushing collar, it makes the structure more labor-saving and convenient to use at the time of implementing the maintenance when exchanging the casings, compared to the prior art counterpart in which the molten metal is poured into the air clearance appeared on the cooling hole and the runner cooling pin.

With the simplified mechanical structure in which the bushing makes the bushing collar tightly engage with the inner wall of the water-communicating hole when inserting the bushing into the water-communicating hole, it becomes possible to obviate the spring-back phenomenon to strengthen the tight-fitting structure, as opposed to the prior art counterpart in which the inner cylinder is press fit into the outer cylinder.

Because the bushing collar positively isolates the bushing from the inner wall of the water-communicating hole, it is possible to keep the bushing off the water-communicating hole, thereby preventing the aqueous medium from seeping into the water-communicating hole even when the die cracks occur on the metal die.

Upon removably mounting the flange portion on the cylindrical body, it becomes possible to insert the cylindrical body into the water-communicating hole even if the flange portion is non-concentric with the cylindrical body and the water-communicating hole. This makes it possible to quickly assemble the flange portion to the cylindrical body and the water-communicating hole.

By obviating the need of concentrically aligning the cylindrical body with the cylindrical body and the water-communicating hole, and also obviating the need of using a welding jig to prevent the cylindrical body from being unfavorably deformed, it is possible to readily reduce the bushing device into mass production.

By mounting the flange portion on the cylindrical body through the hermetic sealing means, it is possible to tightly engage the flange portion with the cylindrical body, thereby positively preventing a water leakage between the flange portion and the cylindrical body. By attaching the hooking means on the open-ended portion of the cylindrical body, it becomes possible to easily take the cylindrical body out of the water-communicating hole by catching the hooking means with a special tool.

By inserting the deformable filler into the air clearance between the bushing and the bushing collar, it render unnecessary to demand exact dimensional sizes for the bushing and the water-communicating hole, thereby making it easy to check and control the products.

By inserting the metallic paste such as, for example, the metallic fibers and zinc into the air clearance between the bushing and the bushing collar, it is possible to prevent the rust from occurring on the bushing and the bushing collar, while improving the heat-conductive efficiency therebetween.

BRIEF DESCRIPTION OF THE DRAWINGS

A preferred form of the present invention are illustrated in the accompanying drawings in which.

DETAILED DESCRIPTION OF PREFERRED EMBODIMENTS

Figure 1:
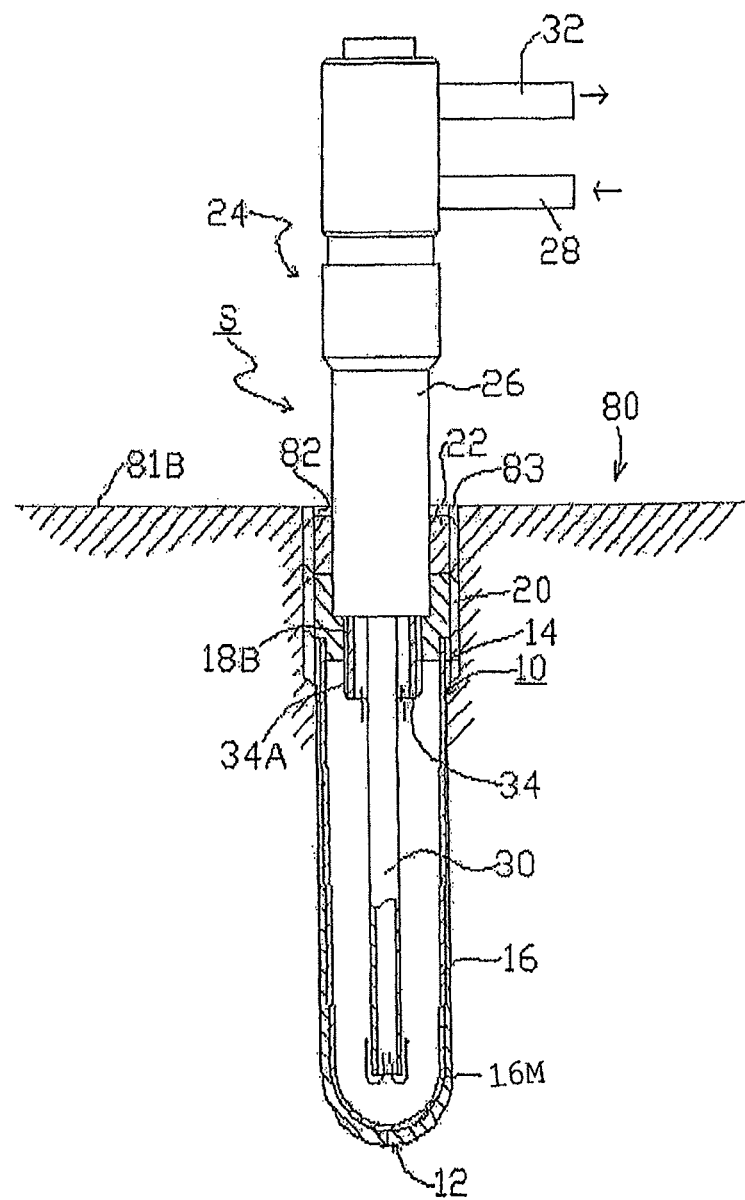
FIG. 1 is a schematic view of a water-communicating mechanism according to an embodiment of the invention.

In the following description of the depicted embodiments, the same reference numerals are used for features of the same type. Positions and directions of the various members are used to correspond to right-left sides, and up-down sides of the attached drawings throughout each embodiment of the invention.

Referring to FIGS. 1 through 7 which shows a bushing device, a water-communicating mechanism and a method of making the water-communicating mechanism, the bushing device serves as a cooling type bushing device 10, and the water-communicating mechanism serves as a metal die cooling mechanism S according to an embodiment of the invention.

Figure 2:
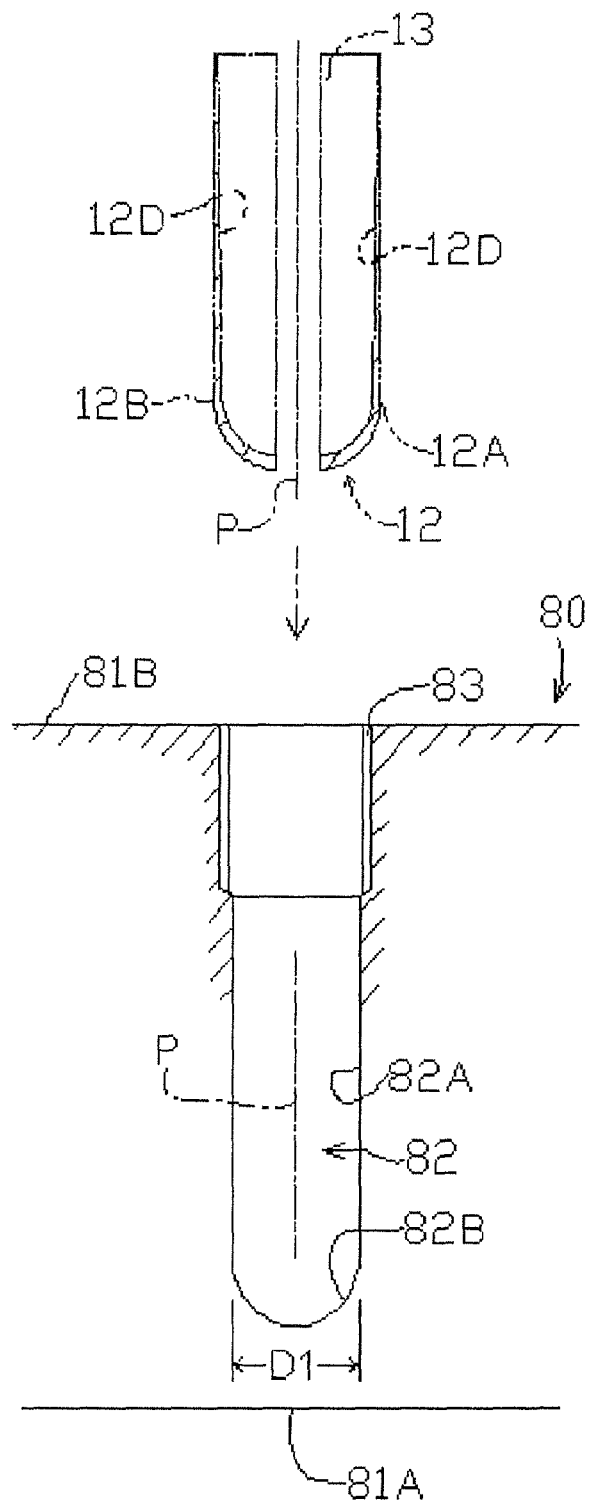
FIG. 2 is a longitudinal cross sectional view of a water-communicating hole in the water-communicating mechanism.

A metal die 80 is incorporated into the metal die cooling mechanism, and categorically covered by a device body as an item to be cooled. As shown in FIGS. 1 and 2, the metal die 80 has a cavity side 81A which configures the item to be cast, and having a die side 81B placed opposite to the cavity side 81A to have a cooling hole 82 cylindrically formed as a water-communicating hole.

At an upper end portion of the cooling hole 82, a female thread portion 83 is circumferentially provided as clearly shown in FIG. 2. From the female thread portion 83 downward, the downward hole 82A is consecutively provided. An inner diameter of the female thread portion 83 is identical to an inner diameter D1 of the downward hole 82A. The cooling hole 82 has a bottomed portion which is defined as a semi-spherical portion 82B.

As shown in FIG. 1, the metal die cooling mechanism S has the cooling type bushing device 10 and a lock nut 22, the latter of which positively places the bushing device 10 in position within the cooling hole 82. A coupler pipe 24 is connected to the bushing device 10. The bushing device 10 together with the coupler pipe 24 partly forms a water communication passage (equivalent to a cooling circuit) which continuously supplies and drains a coolant as an aqueous medium (water-communicating medium).

Figure 4:
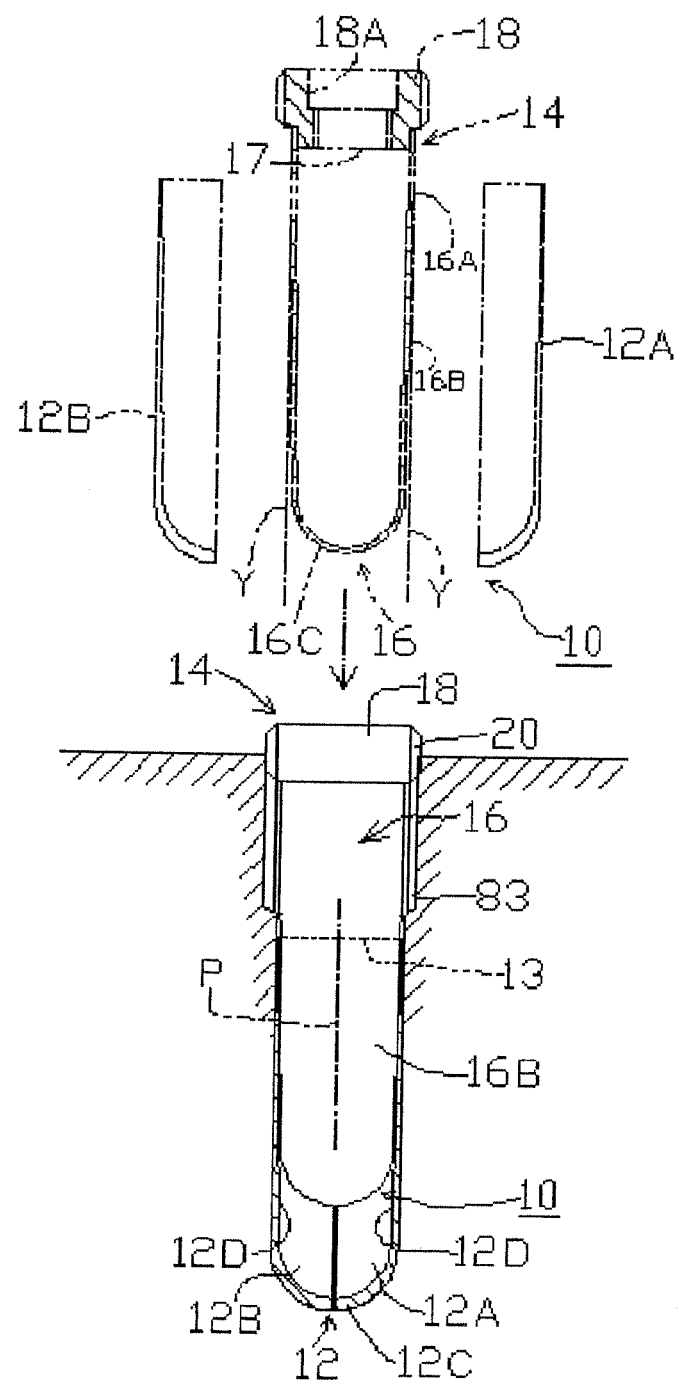
FIG. 4 is a longitudinal cross sectional view of a bushing which is inserted into the bushing collar installed in the water-communicating hole.

As shown in FIG. 4, the cooling type bushing device 10 is a combination of a cooling type bushing collar 12 and a cooling type bushing 14. The cooling type bushing collar 12 serves as a bushing collar which can be merely referred to as a collar hereinafter. The collar 12 and the bushing 14 are configured in accordance with contours of the cooling hole 82. The collar 12 is cut along a longitudinal direction to be divided into two symmetrical parts as shown at phantom lines in FIG. 2.

The collar 12 is cut in a manner to divide a maximum diameter (equivalent to a diametrical portion) of the collar 12 into a pair of collar pieces 12A, 12B cut along the longitudinal direction.

Figure 3:
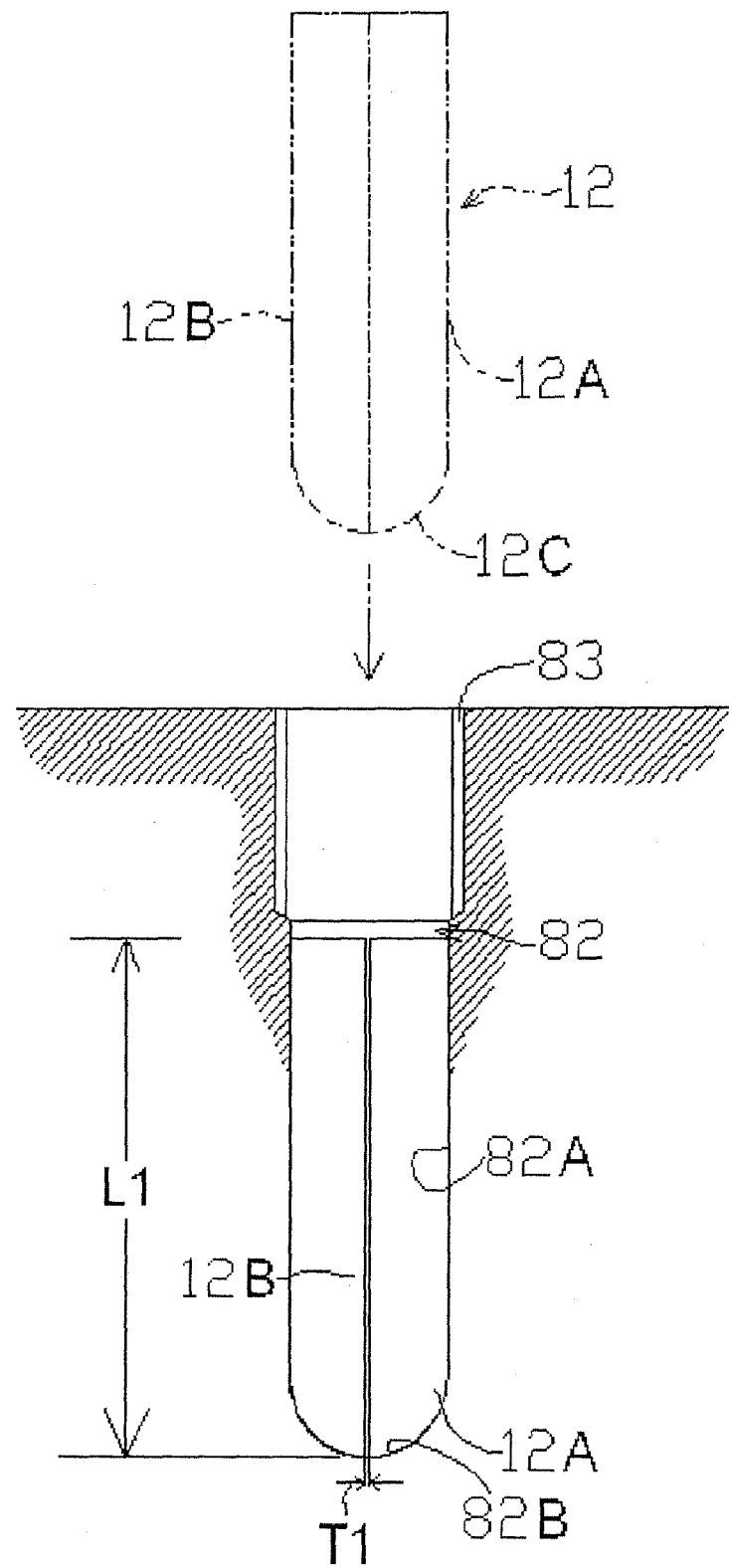
FIG. 3 is a longitudinal cross sectional view of a bushing collar which is inserted into the water-communicating hole.

When the collar 12 is inserted in the cooling hole 82, a gap distance T1 appears between longitudinal sides of the collar pieces 12A, 12B as shown at solid lines in FIG. 3. For this reason, each of the collar pieces 12A, 12B is shaven at the diametrical portion by half of the gap distance T1 along their longitudinal sides.

The collar 12 is preferably made by pressing a metallic material such as, for example, copper and aluminum which are higher in both heat-conductivity and ductility compared to a ferrous steel metal. By making the identical collar pieces 12A, 12B by means of a pressing procedure, it is possible to manufacture the collar 12 with a lower cost.

After the collar 12 and the cooling type bushing 14 are each inserted into the cooling hole 82, the collar 12 forms a cylindrical configuration having a bottomed portion which aligns along an axial line P of the cooling hole 82 as shown at dot-dash lines in FIG. 2. A leading portion of the collar 12 is configured in conformity with the semi-spherical portion 82B of the cooling hole 82.

Namely, a leading end of the collar 12 forms a semi-spherical end portion 12C as shown in FIG. 4. The collar 12 has a length L1 which is somewhat smaller than a total length of the downward hole 82A and the semi-spherical portion 82B as shown in FIG. 3.

Figure 6:
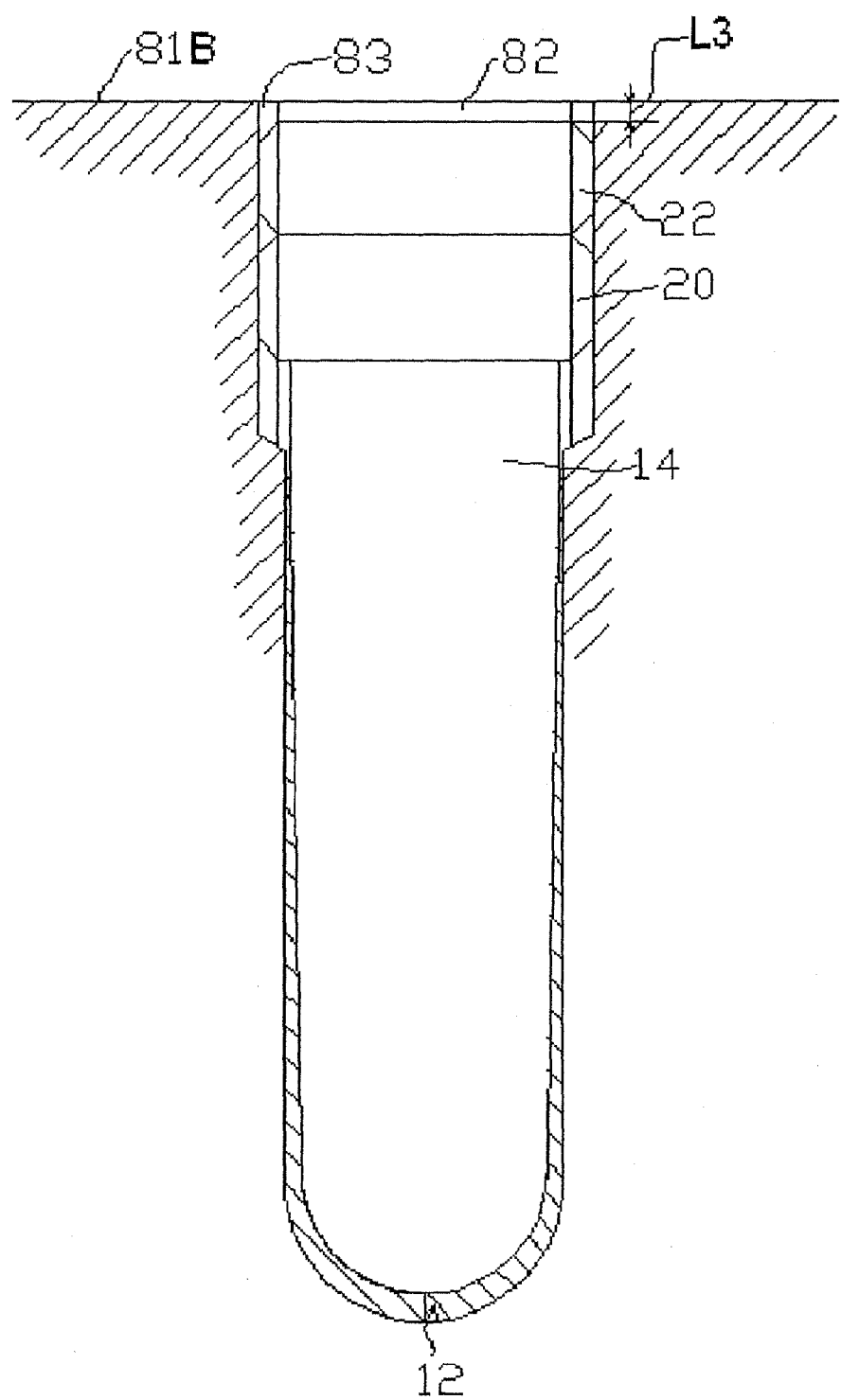
FIG. 6 is a longitudinal cross sectional view of the bushing in which the lock nut is tightened by a predetermined amount of turns.

A diametrical dimension of the collar 12 is arranged to be identical to the inner diameter D1 of the downward hole 82A when the cooling type bushing 14 is secured to the cooling hole 82 as shown in FIG. 6.

As shown at the phantom lines in FIG. 2, the collar 12 has an outer surface aligned along the axial line P. The collar 12 is arranged to bring the outer surface into tight-fitting engagement with an inner surface of the cooling hole 82. Instead of the word of tight-fitting engagement, the word of engagement is used as the same meaning hereinafter unless particularly specified.

In the meanwhile, as shown in FIG. 4, an inner surface of the collar 12 forms a tapered surface 12D which slants against the axial line P. The collar 12 has a thickness which progressively increases as approaching the semi-spherical end portion 12C from an insert opening 13 which serves as an open end of the collar 12. For this reason, the tapered surface 12D inclines against the axial line P from the insert opening 13 to the semi-spherical end portion 12C. This means that the collar 12 has the inner surface configured to be tapered off toward the semi-spherical end portion 12C. By way of illustration, the collar 12 is bored so that the tapered surface 12D has a gradient by a rate of 1/200.

As shown in FIG. 4, the cooling type bushing 14 has a bottom-ended cylindrical body 16 and a flange portion 18, the latter of which is secured (fixedly attached) to an open end 17 of the cylindrical body 16 by means of welding procedure (e.g., soldering means). The cylindrical body 16 serves as an internal lining of the water-communicating mechanism.

Figure 5:
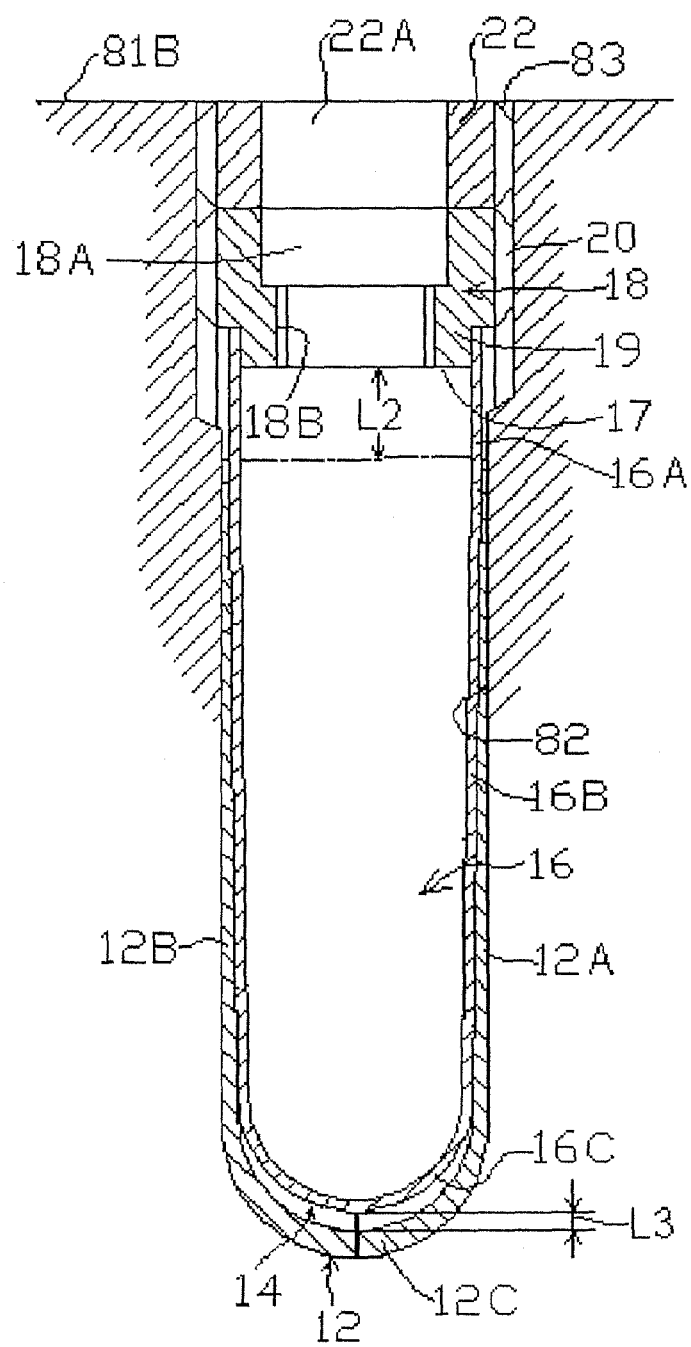
FIG. 5 is a longitudinal cross sectional view of a bushing secured to the metal die by means of a lock nut.

As shown in FIG. 5, the flange portion 18 has an insert portion 19 and which is to be in communication with the open end 17 of the cylindrical body 16. The flange portion 18 also has a circumferential portion, around which a male thread portion 20 is provided to be diametrically greater than the insert portion 19. The flange portion 18 makes its male thread portion 20 tightened into the female thread portion 83 of the cooling hole 82.

It is to be noted that the outer diameter of the insert portion 19 is somewhat smaller than an inner diameter of the open end 17, so that the flange portion 18 can be inserted into the cylindrical body 16.

The flange portion 18 has a hexagonal wrench hole 18A, to which the Allen wrench (a.k.a. a hexagonal wrench, but not shown) is applied. The wrench hole 18A lies in registration with the male thread portion 20. Under the wrench hole 18A, the flange portion 18 has a female thread portion 18B to be in communication with the wrench hole 18A. The female thread portion 18B is adapted to mesh with a male thread portion 34A which is provided on an outer surface of the coupler pipe 24 as shown in FIG. 1.

It is noted that a welded portion in which the flange portion 18 is bonded to the cylindrical body 16 is located at an outer surface of the cylindrical body 16 in registration with the insert portion 19.

The cylindrical body 16 has a straight portion 16A, a tapered surface 16B and a semi-spherical bottom 16C as shown in FIG. 5. The straight portion 16A which secures the flange portion 18, equi-diametrically extends by a length L2 from the open end 17 of the cylindrical body 16 as shown in dot-dash lines in FIG. 5.

The tapered surface 16B works to pushingly spread the collar pieces 12A, 12B against an inner surface of the cooling hole 82. The semi-spherical bottom 16C is to be in registration with the semi-spherical end portion 12C of the collar 12. The cylindrical body 16 is integrally formed by a high-tension steel metal sheet such as, for example, a mild steel metal by means of the pressing procedure.

It is noted that the cylindrical body 16 may be formed by means of a boring procedure or swaging procedure, in lieu of the pressing procedure.

The tapered surface 16B formed at an inner surface of the cylindrical body 16, is tapered away in accordance with the tapered surface 12D of the collar 12 as observed by dot-dash lines Y which extends downward from the straight portion 16A in FIG. 4. The tapered surface 16B renders its inner diameter somewhat greater that an inner diameter of the tapered surface 12D of the collar 12.

This is because the tapered surface 12B is pushingly spread to be brought into tight-fitting engagement with an inner wall (i.e., inner surface) of the cooling hole 82 upon inserting the cooling type bushing 14 into the collar 12.

As shown in FIG. 6, a lock nut 22 is provided to mesh with the female thread portion 83 of the cooling hole 82, so as to prevent the male thread portion 20 from being inadvertently loosened. The lock nut 22 has a hexagonal wrench hole 22A formed similar to the wrench hole 18A of the flange portion 18.

For this reason, it is possible to concurrently secure the lock nut 22 and the cooling type bushing 14 to the cylindrical body 16 by putting the wrench into the two holes 18A, 22A at the same time.

Figure 7:
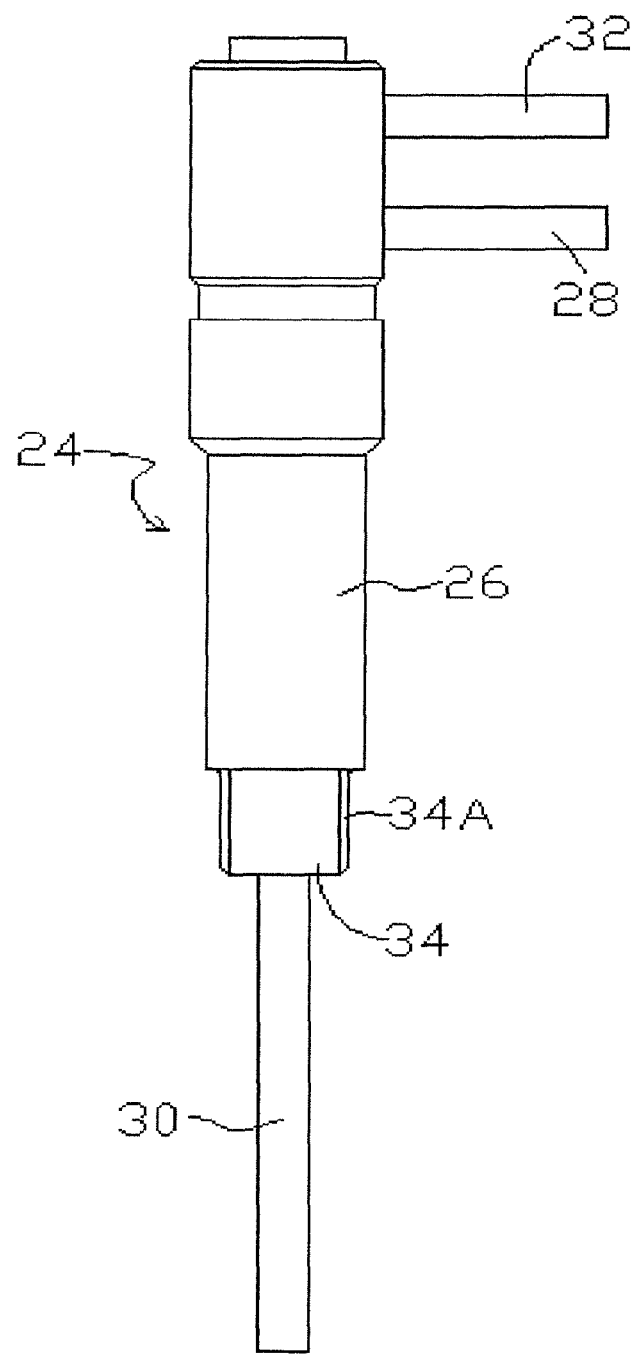
FIG. 7 is a side elevational view of a coupler pipe.

As shown in FIG. 7, the coupler pipe 24 serves as a water-communicating means, and having a supply connector 28 which continuously supplies a coolant (e.g., aqueous medium, water) to the cooling type bushing 14. Connected to the supply connector 28 is a supply pipe 30.

A drainage connector 32 is to guide the heat-exchanged drain water to an exhaust basin (not shown). Connected to the drainage connector 32 is a water-chute pipe 34. To the supply connector 28, a water-communicating pipe (not shown) is connected which comes from a water source (e.g., faucet of waterworks). The coupler pipe 24 extends the supply pipe 30 to a proximity of a semi-spherical bottom portion 16M of the cylindrical body 16 as shown in FIG. 1.

Into the wrench holes 18A, 22A, a columnar support pipe 26 is inserted to be held upright as shown in FIG. 1. The water-chute pipe 34 which is located under the support pipe 26, is diameter-reduced more than the support pipe 26. To an outer surface of the water-chute pipe 34, a male thread portion 34A is formed. The support pipe 26 is formed into a circular cylinder, so that the support pipe 26 is inserted into and extended through the wrench holes 18A, 22A.

A method of making the metal die cooling mechanism S is described as a method of assembling the metal die cooling mechanism S.

At a collar-insert step, the collar 12 is inserted into the cooling hole 82. At a bushing-insert step, the cooling type bushing 14 is inserted into the collar 12 placed within the cooling hole 82.

At a tight-fitting step (tightly fitting step), the cooling type bushing 14 is pushed further into the cooling hole 82 to assemble the cooling type bushing device 10. After assembling the cooling type bushing device 10, the coupler pipe 24 is installed to the cooling type bushing device 10 at a water-communicating step, so as to finish the assemble of the metal die cooling mechanism S.

At the collar insert step as shown at the phantom lines in FIG. 3, the collar 12 is inserted into the cooling hole 82 with the collar pieces 12A, 12B joined together, so as to make the collar pieces 12A, 12B engaged with the inner wall of the cooling hole 82.

According to the embodiment of the invention, the collar pieces 12A, 12B are formed by dividing the collar 12 into two parts, and the collar pieces 12A, 12B are shaven at the longitudinal sides. This makes the outer diameter of the joined pieces 12A, 12B smaller than the inner diameter of the cooling hole 82, thereby making it possible to readily insert the collar 12 into and take the collar 12 out of the cooling hole 82. This also prevents the inner wall of the cooling hole 82 from being damaged at the time of inserting the collar 12 into and take the collar 12 out of the cooling hole 82.

At the bushing insert step as shown in FIG. 4, the cooling type bushing 14 is placed at the insert opening 13 of the collar 12, and tighten the male thread portion 20 around the female thread portion 83 with the use of the Allen wrench (not shown).

In this situation, the lock nut 22 is tightened to push the cooling type bushing 14 until the lock nut 22 makes its head surface in flush with the die surface 81B of the metal die 80 as shown in FIG. 5.

At the time when the lock nut 22 occupies the flush position, a clearance appears between an apex of the semi-spherical bottom 16C and an innermost concave portion of the semi-spherical end portion 12C as designated at a predetermined distance L3 in FIG. 5.

At the tight-fitting step as shown in FIG. 6, the cooling type bushing 14 is further inserted by the distance L3, the lock nut 22 sinks by the distance L3 under the die surface 81B. This makes the collar 12 (collar pieces 12A, 12B) pushingly spread and tightly engage with the inner wall (i.e., circumferential wall) of the cooling hole 82.

Namely, the cooling type bushing 14 pushes the collar 12 deeper against the inner wall of the cooling hole 82, while at the same time, guiding the tapered surface 16B along the tapered surface 12D of the collar 12 as shown in FIG. 4.

It is to be noted that in order to locate the cooling type bushing 14 in position at a predetermined place as shown in FIG. 6, only the lock nut 22 may be further tightened.

The collar 12 which is pushingly spread against the inner wall of the cooling hole 82, is divided into the collar pieces 12A, 12B as shown in FIG. 3. The collar 12 can be made of the copper metal which is higher in both heat-conductivity and ductility compared to the ferrous steel metal. This makes the collar pieces 12A, 12B elastically deformable to obviate the gap distance T1 to tightly join the collar pieces 12A, 12B together.

At the time of pouring the molten metal into the cavity of the metal die 80, the metal die 80 is heated to rise its temperature. Because the collar 12 thermally expands more than both the metal die 80 and the cooling type bushing 14, the collar pieces 12A, 12B elastically deforms to tightly join the collar pieces 12A, 12B together all the more.

With the result that the cooling type bushing 14 pushingly spreads the collar 12 due to the wedge-shaped effect, the effect brings the collar 12 into tight engagement with the inner wall of the cooling hole 82. This makes it possible to attain the tight-fitting structure between the bushing device 10 and the cooling hole 82 with a simplified construction.

With the collar 12 separating the cooling type bushing 14 from the inner wall of the cooling hole 82, it is possible for the collar 12 to prevent the cooling type bushing 14 from being directly in contact with the inner wall of the cooling hole 82. This makes it possible to avoid the aqueous medium from leaking off the cooling type bushing 14 to the cooling hole even when the die cracks occur on the metal die 80.

With a combined structure that the cooling type bushing 14 engages its tapered surface 16B with the tapered surface 12D of the collar 12, it becomes possible to tightly engage the bushing device 10 with the inner wall of the cooling hole. This makes it possible to achieve a high heat-conductive efficiency therebetween, which is quite favorable when controlling the temperature of the metal die 80.

With the tight-fitting structure simplified between the bushing device 10 and the cooling hole 82, it becomes possible to exchange the bushing devices with less laborious and less time-consuming procedure compared with the prior art counterpart which interposes the molten metal between the cooling hole and the molten-metal cooling pin.

Such is the structure that upon inserting the cooling type bushing 14 into the cooling hole 82, the cooling type bushing 14 tightly engages its tapered surface 12D against the inner wall of the cooling hole 82. This makes it possible to mitigate the spring-back phenomenon, thereby maintaining the tight-fitting structure for an extended period of time, as opposed to the prior art counterpart in which the inner cylinder is press fit into the outer cylinder by means of the shrinkage-fit or cooling-fit procedure.

At the water-communicating step, the coupler pipe 24 is attached to the cooling type bushing 14 after the end of the tight-fitting procedure.

Namely, upon mounting the coupler pipe 24 on the cooling type bushing 14, the supply pipe 30 is inserted into the cooling type bushing 14 as shown in FIG. 1. At the same time, the support pipe 26 is inserted into the wrench hole 18A, 22A of the lock nut 22. Thereafter, the coupler pipe 24 brings its male thread portion 34A to mesh with the female thread portion 18B of the flange portion 18, thereby concurrently preventing the aqueous medium from leaking off the support pipe 26.

In order to complete the water-communicating conduit, the supply connector 28 is attached to the spigot of the waterworks (not shown) through a communication pipe (not shown), and the drainage connector 32 is led to a catchment basin through a communication pipe (not shown).

The tapwater from the waterworks is continuously supplied to the cylindrical body 16 of the cooling type bushing 14 through the supply connector 28 and the supply pipe 30, and drained to the catchment basin through the water-chute pipe 34 and the drainage connector 32 as shown at an arrow in FIG. 1.

During the process in which the tapwater is supplied as the aqueous medium to the cooling type bushing 14, the tapwater cools the metal die 80 through the cooling type bushing 14 when the molten-metal is poured into the cavity. The water heat-exchanged with the die metal is drained outside through the water-chute pipe 34.

Figure 8:
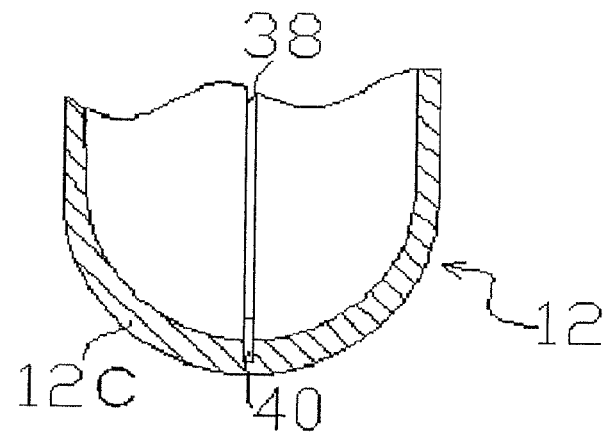
FIGS. 8-10 are longitudinal cross sectional views of a part of the bushing collar according to modification forms A-C of the invention.
Figure 9:
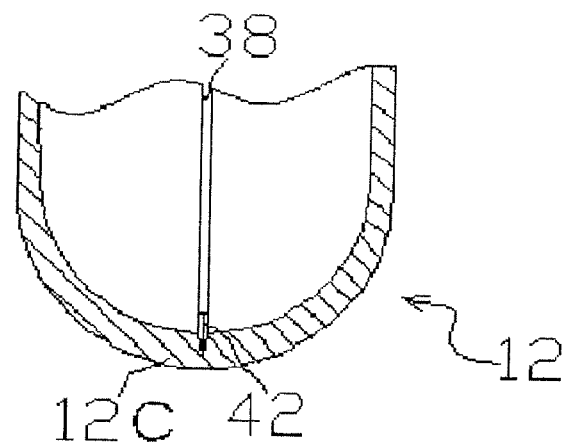
Figure 10:
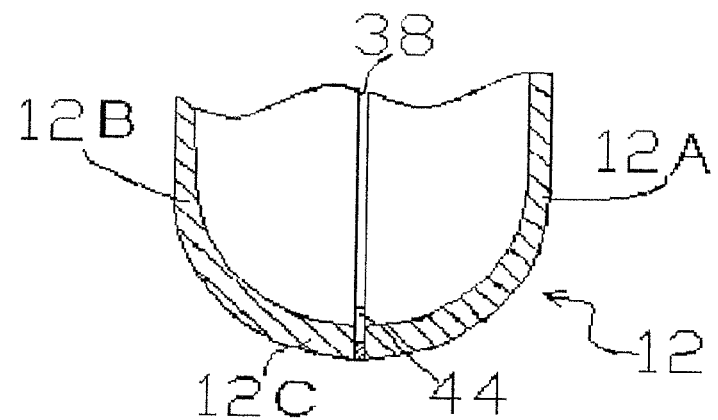

As shown in FIGS. 8-10, it is to be noted that the collar 12 may be integrally formed in one piece, in lieu of dividing it into two collar pieces 12A, 12B.

In a first modification form A depicted in FIG. 8, a notched portion 38 is formed along the axial direction of the collar 12. The notched portion 38 extends from the insert opening 13 to the proximity of the apex of the semi-spherical end portion 12C.

The apex of the semi-spherical end portion 12C may be formed into a thickness-reduced configuration as designated by a thickness-reduced connection 40 in FIG. 8. The thickness-reduced connection 40 is smaller in thickness by ⅓ than the semi-spherical end portion 12C.

Upon inserting the collar 12 into the cooling hole 82, the collar 12 flexes its basal portion, thereby making it readily to insert the collar 12 into and take the collar 12 out of the cooling hole 82. The integrally formed collar 12 prevents the collar 12 from being advertently lost, as opposed to the case in which the collar 12 is divided into the collar pieces 12A, 12B.

In a second modification form B depicted in FIG. 9, the thickness-reduced connection 40 serves as a kerf 42 which is V-shaped in cross section.

The kerf 42 has a depth dimension which is equivalent to one-third of the thickness measured at the apex of the semi-spherical end portion 12C. In the second modification form B, the same advantages are achieved as accomplished in the first modification form A.

In a third modification form C depicted in FIG. 10, the leading end portions (apexes) of the collar pieces 12A, 12B are bonded together to form a bonded connection 44 by means of such as, for example, the welding procedure.

The bonded connection 44 has a thickness dimension which is equivalent to one-third of the thickness measured at the apex of the semi-spherical end portion 12C. In the third modification form C, the same advantages are achieved as accomplished in the first modification form A.

Figure 11:
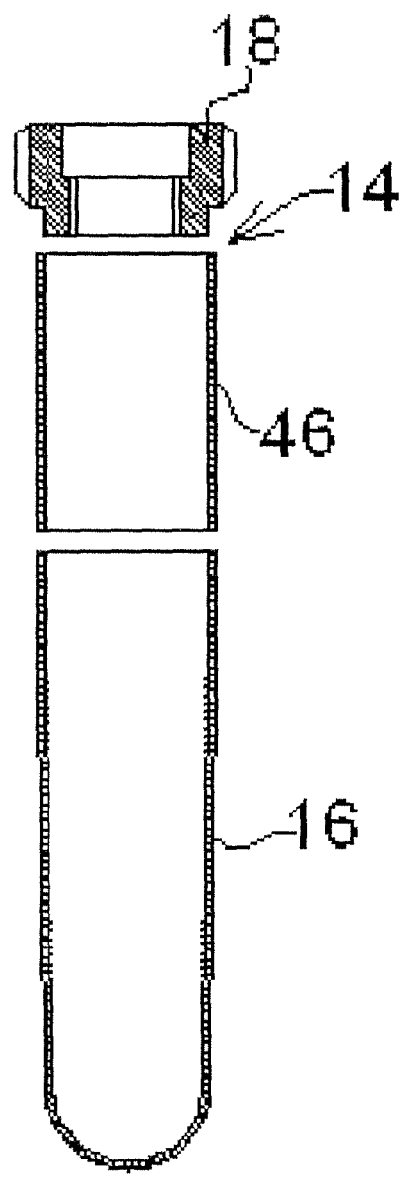
FIGS. 11-17 are exploded cross sectional views of the bushing according to modification forms D-I of the invention.
Figure 12:
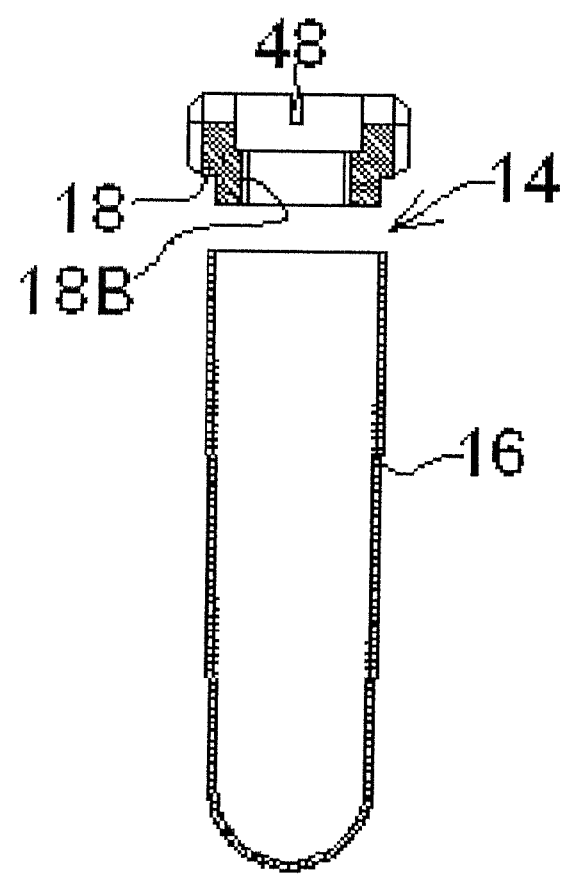

FIGS. 11 and 12 respectively show modification forms D and E represented by the cooling type bushing 14 in FIG. 5.

In the modification form D depicted in FIG. 11, an extension pipe 46 is provided to connect between the flange portion 18 and the cylindrical body 16.

This is because the extension pipe 46 is used when the cooling type bushing 14 is greater in length than the cooling hole 82 in FIG. 1. The extension pipe 46 is fixedly connected to each of the flange portion 18 and the cylindrical body 16 by means of the welding procedure. The other structure than the extension pipe 46 is the same as described in the embodiment of FIG. 4, describing the identical structure is omitted.

In the modification form E depicted in FIG. 12, a criss-cross groove 48 is provided on an upper surface of the flange portion 18. The criss-cross groove 48 is used when screwing the cooling type bushing 14 into the cooling hole 82.

In this instance, in lieu of the wrench hole 18A in FIG. 5, a circular hole may be provided which is in communication with the female thread portion 18B of the flange portion 18. The other structure than the criss-cross groove 48 is the same as described in the embodiment of FIG. 4, describing the identical structure is omitted.

Figure 13:
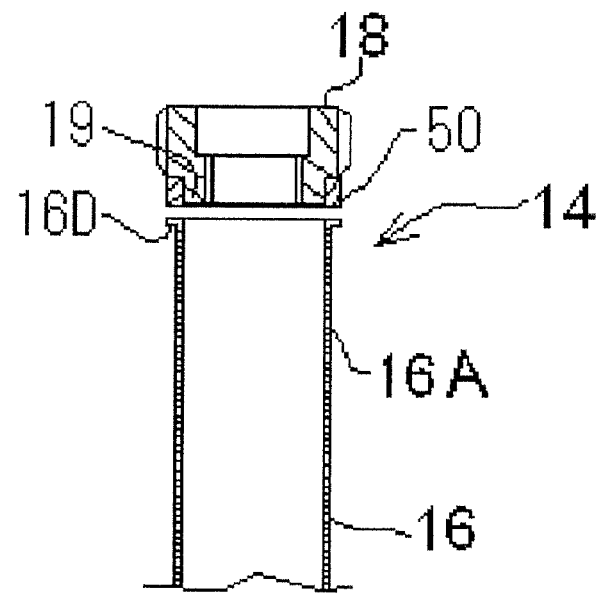
Figure 14:
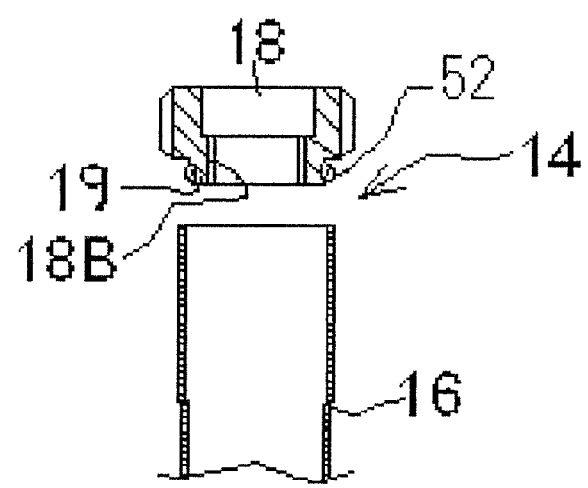

FIGS. 13 and 14 respectively show modification forms F and G represented by the cooling type bushing 14 in FIG. 5. In both the modification forms F and G, the flange portion 18 is removable mounted on the cylindrical body 16.

The modification forms F and G are employed to the case in which the flange portion 18 defies to concentrically align in the cylindrical body 16 when the flange portion 18 is bonded to the cylindrical body 16 by means of the welding procedure (e.g., soldering or brazing procedure) as observed in the preceding embodiment.

In the modification form F depicted in FIG. 13, an upper end of the cooling type bushing 14 has an outer flange 16D in perpendicular to the axial direction integrally formed upon drawing the cooling type bushing 14. The outer flange 16D is placed such as not to interfere in the female thread portion 83 of the cooling hole 82.

In the flange portion 18 of the insert portion 19, the insert portion 19 determines its outer diameter somewhat greater than an inner diameter of the straight portion 16A of the cylindrical body 16.

Into an outer surface of the insert portion 19, an annular sealant 50 is inserted as a hermetic sealing means. The sealant 50 which is slightly greater in axial length than the insert portion 19, is provided by molding a synthetic resin by way of illustration.

The sealant 50 has an inner diameter which is slightly smaller than an outer diameter of the insert portion 19. For this reason, the sealant 50 is fixedly installed on the flange portion 18 to tightly fit against the insert portion 19 and the flange portion 18.

Namely, the sealant 50 is fixedly pressed against the outer flange 16D of the cylindrical body 16, while at the same time, a lower side of the insert portion 19 comes in contact with the outer flange 16D. This makes it possible to airtightly seal between the flange portion 18 and the outer flange 16D, thereby preventing the coolant (aqueous medium) from leaking through therebetween.

With the flange portion 18 removably mounted on the cylindrical body 16, it is possible to insert the cooling type bushing 14 into the cooling hole 82 even when the flange portion 18 defies to concentrically align in the cylindrical body 16. This also makes it possible to readily assemble the flange portion 18 to the cylindrical body 16.

The above structure enables users to obviate the concentrically aligning procedure against the cylindrical body 16, while at the same time, removing the need of handling a welding jig to prevent the cylindrical body from being unfavorably deformed, it is possible to readily reduce the cooling type of bushing 14 into mass production with an improved efficiency. The other structure than the removably mounting components is the same as described in the embodiment of FIG. 5, describing the identical structure is omitted.

It is further to be noted that the sealant 50 may be determined to be smaller in axial length than the insert portion 19, so that the insert portion 19 can be dimensionally determined to be insertable into an inner surface of the cylindrical body 16.

In the modification form G depicted in FIG. 14, the cooling type of bushing 14 makes an O-ring 52 place around an outer surface of the insert portion 19. On the outer surface of the insert portion 19, a circumferential groove is provided into which the O-ring 52 is interfit. The insert portion 19 together with the O-ring 52 is inserted into (i.e., connected to) the cylindrical body 16.

In this situation, it is to be noted that the outer flange 16D can be omitted from the cylindrical body 16. The other structure than the O-ring 52 and the groove is the same as described in the modification form F, describing the identical structure is omitted.

Figure 15:
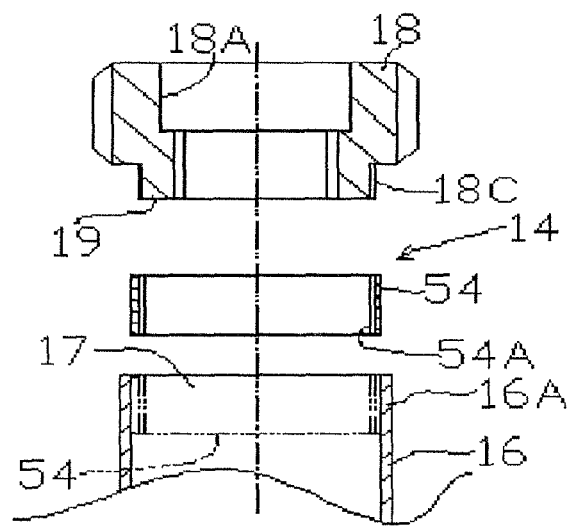

In the modification form H depicted in FIG. 15, the flange portion 18 is removably mounted on the cylindrical body 16 by means of a screw component provided as the hermetic sealing means.

As mentioned in the modification forms depicted in FIGS. 13 and 14, the modification form H makes it possible to insert the flange portion 18 into the cylindrical body 16 even when the flange portion 18 does not concentrically align with the cylindrical body 16.

In the modification form H, a screw collar 54 is welded as a reinforcement to an inner side of the straight portion 16A (open-ended portion 17) of the cylindrical body 16. The screw collar 54 is formed into an annular configuration, and having an inner surface which is formed into a female thread portion 54A to serve as a hooking means.

Figure 16:
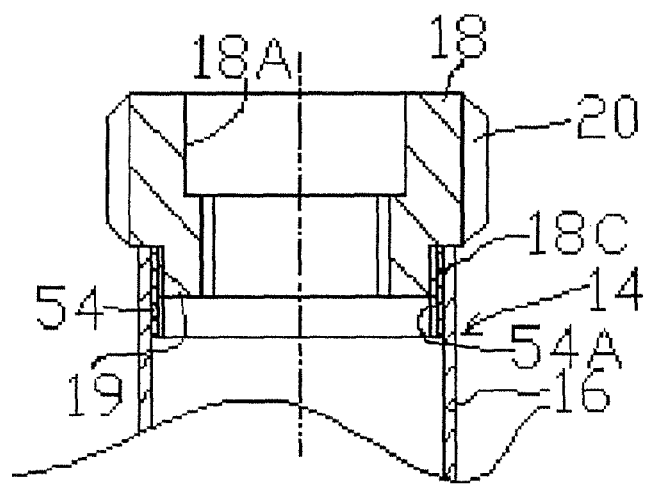

On an outer surface of the insert portion 19, a male thread portion 18C is provided which meshes with the female thread portion 54A, so as to resultantly secure the flange portion 18 to the cylindrical body 16 through the screw collar 54 as shown in FIG. 16.

The screw collar 54 has an outer diameter determined to be slightly greater than an inner diameter of the straight portion 16A. The screw collar 54 press fits its outer surface circumferentially into an upper end portion of the straight portion 16A as shown at phantom lines in FIG. 15. Weldment is applied entirely to a press fitting area between the screw collar 54 and the straight portion 16A by means of the welding procedure.

With the screw collar 54 press fit into the cylindrical body 16, it is possible to minimize the deformation caused by the thermal influence, to which the cylindrical body 16 is subjected due to the welding procedure (fixing means).

Thereafter, the cylindrical body 16 is inserted into the cooling hole 82, and then the flange portion 18 is secured to the screw collar 54 by meshing the male thread portion 18C with the female thread portion 54A.

In this situation, a heat-resistant sealant (not shown) may be applied to the male thread portion 18C or the female thread portion 54A to hold an air-tightness therebetween.

In the modification form H, such is the structure that the flange portion 18 is inserted into the cylindrical body 16 through the screw collar 54. This makes it possible to omit the axially aligning procedure between the flange portion 18 and the cylindrical body 16, thereby enabling the users to improve an assemble efficiency when reduced to mass production.

Upon meshing the male thread portion 18C with the female thread portion 54A, the Allen wrench (not shown) is applied to the hexagonal hole 18A as observed in FIG. 16. The other structure than the screw collar 54 and the male thread portion 18C is the same as described in the modification forms F and G, describing the identical structure is omitted.

It is to be noted that the flange portion 18 may be provisionally welded to the cylindrical body 16.

In this instance, the flange portion 18 is welded at four locations at regular intervals (e.g., 90 degrees) to the outer surface of the cylindrical body 16, the locations of which correspond to the insert portion 19.

Even with the provisional welding procedure applied to the cylindrical body 16, it is sufficient to fixedly secure the flange portion 18 to the cylindrical body 16, while minimizing the unfavorable deformation due to the welding procedure. The screw collar 54 may be used to the cylindrical body 16 formed integral with the outer flange 16D.

Figure 17:
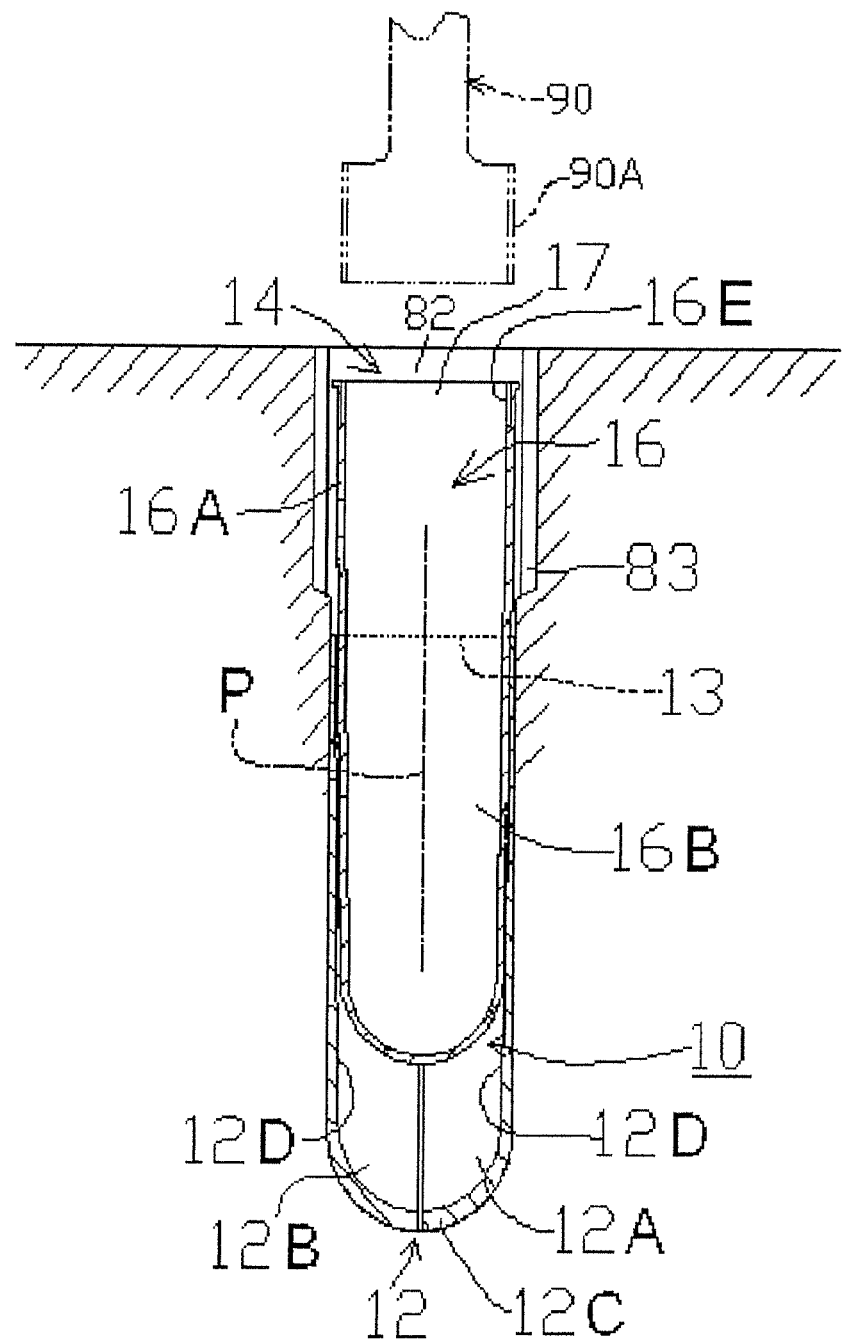

FIG. 17 shows a modification form I of the cooling type bushing 14 in which the flange portion 18 is removably mounted on the cylindrical body 16. A female thread portion 16E is directly formed on the inner surface of the straight portion 16A to serve as a part of the hermetic sealing means.

The insert portion 19 has an outer diameter corresponding to the female thread portion 16E. The outer surface of the insert portion 19 has the male thread portion 18C (referred to FIG. 15) to serve as a part of the hermetic sealing means or the hooking means.

The flange portion 18 brings the male thread portion 18C to mesh with the female thread portion 16E upon securing the flange portion 18 to the cylindrical body 16. In this situation, the heat-resistant sealant (not shown) may be applied to the male thread portion 18C or the female thread portion 16E to hold the air-tightness therebetween. The sealant 50 as observed in FIG. 13 may be used to a basal end of the insert portion 19.

In order to take the cylindrical body 16 out of the cooling hole 82, the flange portion 18 is first taken from the cylindrical body 16 by applying the Allen wrench to the hexagonal hole 18A (refer to FIG. 15). Then, a special tool 90 (knock-release tool) is used to take the cylindrical body 16 out of the cooling hole 82. The special tool 90 has a slidable weight which produces an impact when slid along a rail (not shown) to release an item (cylindrical body 16) to be taken out.

The special tool 90 has a male thread portion 90A meshed with the female thread portion 16E. By sliding the weight, the impact enables the users to readily release the cylindrical body 16 out of the cooling hole 82.

When the flange portion 18 is fixedly secured to the cylindrical body 16 by means welding procedure as shown in FIG. 5, the special tool 90 brings the male thread portion 90A to mesh with the female thread portion 18B, in order to take the flange portion 18 out of the cooling hole 82. It is noted that any hook portion will be usable so long as it can be caught with a detachment tool. The other structure than the special tool 90 is the same as described in the modification form H, describing the identical structure is omitted.

Figure 18:
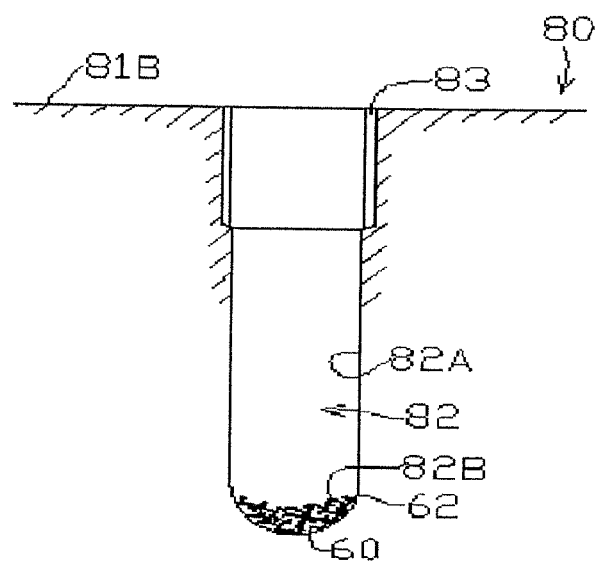
FIG. 18 is a longitudinal cross sectional view of a filler which is inserted into the water-communicating hole according to a modification form K of the invention.
Figure 19:
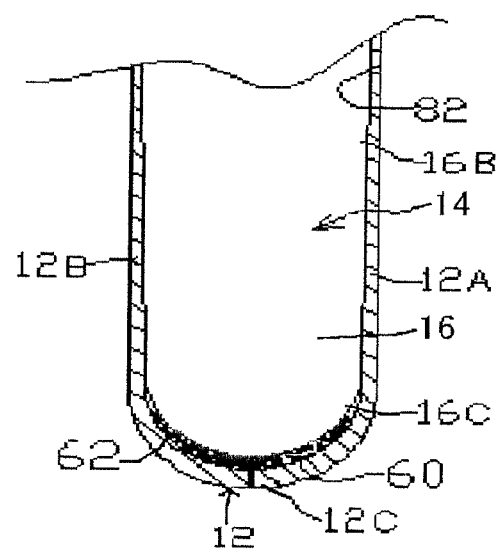
FIG. 19 is a longitudinal cross sectional view of the filler which is inserted between the bushing and the bushing collar.

In a modification form K depicted in FIGS. 18 and 19, a filler is provided entirely at a first clearance between the collar 12 and the cooling hole 82, or the filler is provided entirely at a second clearance between the collar 12 and the cooling type bushing 14 as an air-bleeding action. This is to ameliorate the heat-conductive efficiency between the collar 12 and the cooling hole 82, or between the collar 12 and the cooling type bushing 14. By way of illustration, a bundle of a metallic fibers 60 available in market or a certain amount of a metallic paste 62 is used as the filler.

The metallic fibers 60 (around 50 μm in diameter) are made from metals combined with titanium, copper and brass. The metallic paste 62 has a granulated zinc (around 96% of a total) and a non-combustible epoxy resin as a rust-resistant material. Zinc has a tendency to ionize and oxidize in preference to iron. An oxide film formed on zinc prevents the rust from appearing thereon. Zinc also has a heat-conductivity higher than that of iron (equivalent to that of copper), and less soluble than aluminum. For this reason, zinc is well-suited to fill the clearances with the filler. The filler categorically includes a metallic powder (e.g., granulated copper).

In the modification form K depicted in FIG. 18, the first clearance is filled with the metallic fibers 60 or the metallic paste 62 between the cooling hole 82 and the collar 12. Then, the second clearance is filled with the metallic fibers 60 or the metallic paste 62 between the cooling type bushing 14 and the collar 12. The metallic fibers 60 or the metallic paste 62 deforms in accordance with the shape of the clearances to fully load the clearances because the metallic fibers 60 plastically displaces and the metallic paste 62 evenly flows. In case of the metallic paste 62, the paste 62 may be molded by means of a sintering procedure.

An amount of the metallic fibers 60 and an amount of the metallic paste 62 may be altered under different circumstances. The metallic fibers 60 and the metallic paste 62 may be employed in combination or singularity. The filler may be applied only to one of the first clearance and the second clearance. Alternatively, the filler may be applied both of the first clearance and the second clearance.

The filler is deformable that the filler loads the clearances with the metallic fibers 60 (metallic paste 62) in accordance with the shape of the clearances. This allows a latitude in precision to the cooling type bushing device 10 and the cooling hole 82, thereby rendering it easy to maintain and control the products. The filler makes it possible to improve the heat-conductive efficiency while preventing the rust from appearing thereon.

Figure 20:
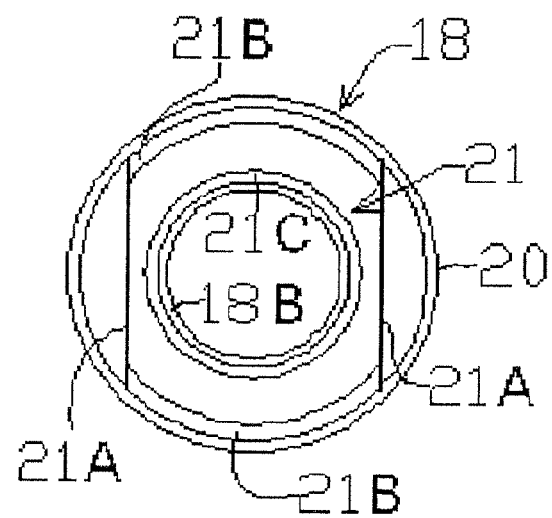
FIG. 20 is a plan view of a flange portion according to a modification form M of the invention.
Figure 21:
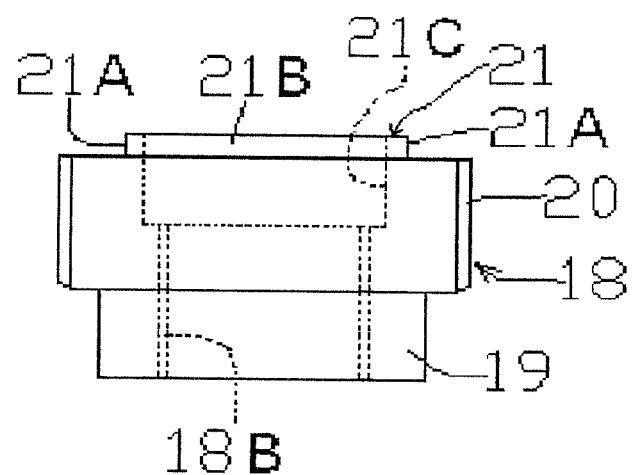
FIG. 21 is a side elevational view of the flange portion.

In a modification form M depicted in FIGS. 20 and 21, the flange portion 18 and the lock nut 22 are deformed to prevent the flange portion 18 from being inadvertently loosened. The flange portion 18 forms a hook head 21 on the upper surface of the male thread portion 20. The hook head 21 has straight portions 21A and tapered portions 21B, the latter of which are consecutively formed from a peripheral portion of the straight portions 21A. The hook head 21 is determined to be diametrically smaller than the male thread portion 20.

The hook head 21 is linearly notched at both sides to form a pair of the straight portions 21A, so that the straight portions 21A can be caught by a spanner (tightening tool). The tapered portions 21B position between the opposed straight portions 21A, and extend from an outer periphery of the hook head 21 toward the male thread portion 20, so as to form an arc-shaped configuration.

As shown at broken lines in FIG. 21, the flange portion 18 forms a circular hole 21C diametrically greater than the female thread portion 18B, and designed to be in communication with the female thread portion 18B. To the circular hole 21C, the support pipe 26 of the coupler pipe 24 (refer to FIG. 5) is to be inserted.

Figure 22:
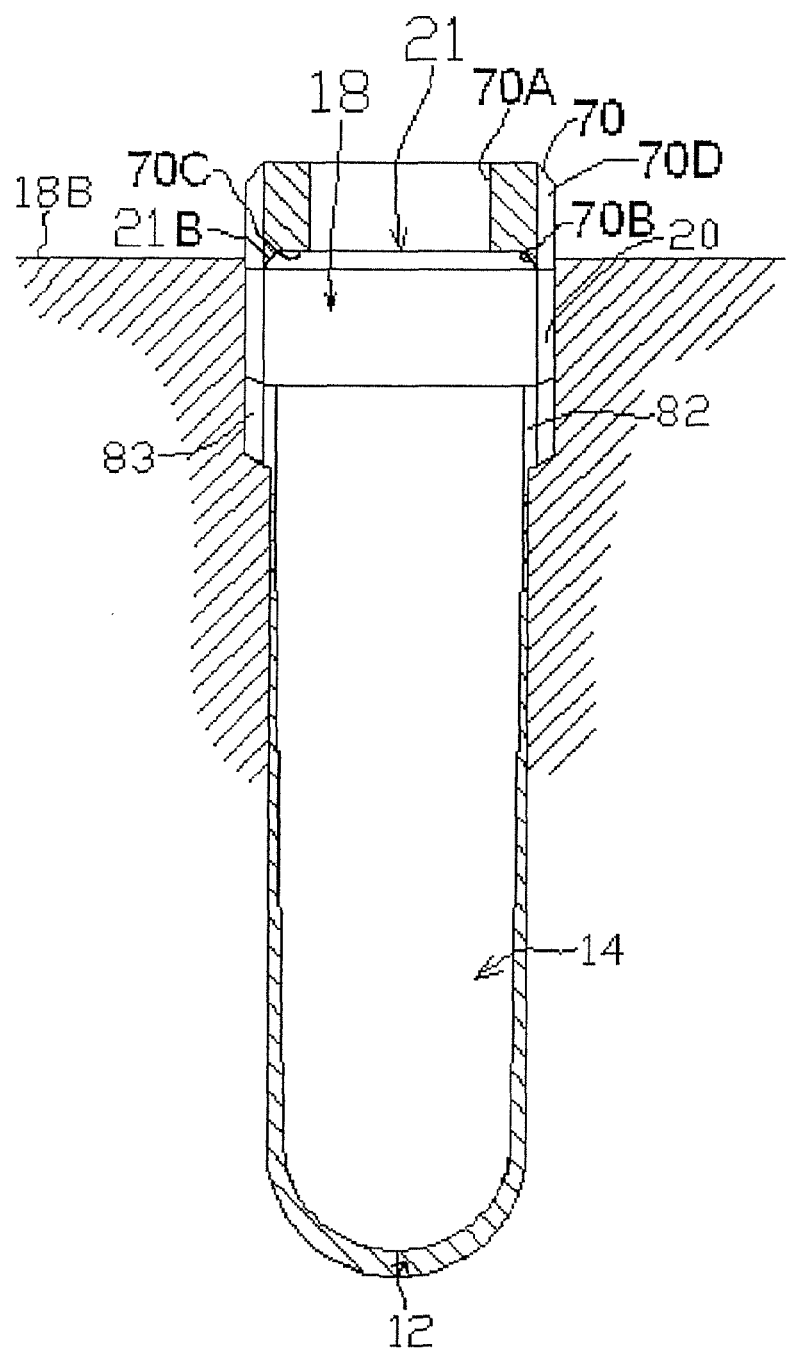
FIG. 22 is a longitudinal cross sectional view of the flange portion which is secured by means of the lock nut.

As shown in FIG. 22, a lock nut 70 is provided to be diametrically identical to the male thread portion 20 of the flange portion 18. The lock nut 70 has a wrench hole 70A to which the Allen wrench is applied, while at the same time, the wrench hole 70A is formed to guide the support pipe 26 to pass through.

The lock nut 70 has a lock surface 70C located to face the flange portion 18. The lock surface 70C has an outer peripheral portion flared to entirely engage with the tapered portion 21B so as to form a tapered surface 70B.

With an outer side of the lock nut 70, a male thread portion 70D is provided to mesh with the female thread portion 83 of the cooling hole 82, as is the case with the male thread portion 20 of the flange portion 18.

The lock nut 70 engages its lock surface 70C with the flange portion 18, and brings the tapered surface 70B into tight engagement with the tapered portions 21B of the hook head 21 when the lock nut 70 is tightened.

In the modification form M, the cooling type bushing 14 is first inserted into the cooling hole 82. Then, the spanner is applied to the straight portions 21A in order to turn the lock nut 70 to place the cooling type bushing 14 in position in the cooling hole 82.

With the use of the Allen wrench, the lock nut 70 presses the flange portion 18 and resultantly brings its male thread portion 70D into engagement with the female thread portion 83 of the cooling hole 82.

In the modification form M, the double-nut action exerts between the male thread portion 20 and the male thread portion 70D, while the wedge-shaped effect works between the tapered portion 21B and the tapered surface 70B.

Due to the double-nut action and the wedge-shaped effect, it is possible to further prevent the flange portion 18 (i.e., cooling type bushing 14) from being loosened.

The device body categorically includes the metal die (shown in the preceding embodiment) and an engine.

Figure 23:
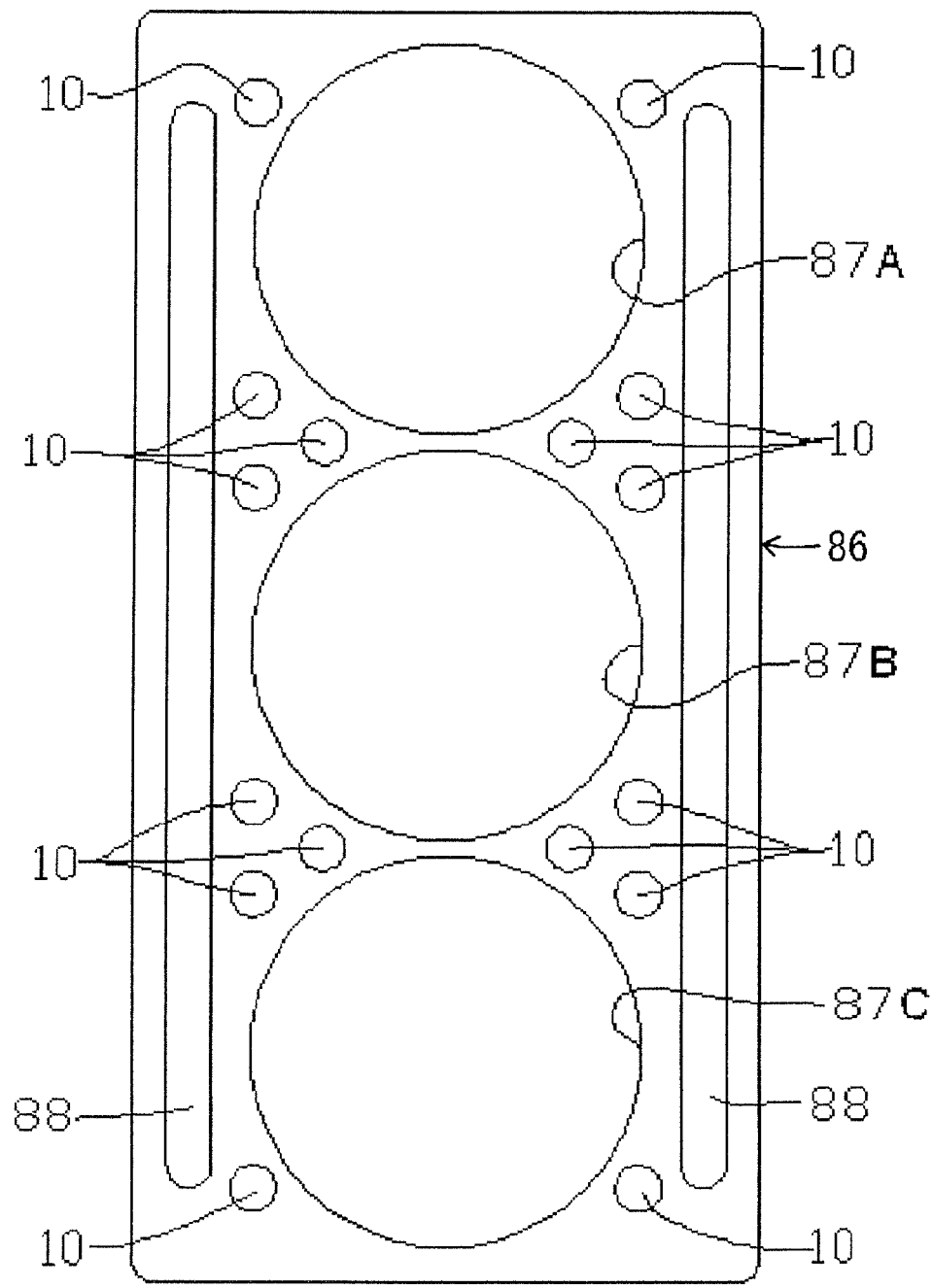
FIG. 23 is a plan view of the bushing device which is mounted on an engine.

In a three-cylinder type engine 86 depicted in FIG. 23, it is considered to be structurally difficult to cool a central cylinder 87B among the three cylinders 87A-87C. In order to overcome the difficulty, a plurality of the cooling type bushing devices may be convergently located around the central cylinder 87B.

In this instance, water jackets 88 are placed at both sides to straddle the cylinders 87A-87C. This enables the users to cool the cylinder 87B not only by the water jackets 88 but also by the plurality of the cooling type bushing devices. The water coolant may be circulated either through one-way or two-way path.

The device body also includes a central processing unit (CPU) of a super computer, a capacity of which is such as to require one floor of a building to accommodate. Namely, the cooling type bushing device 10 is applicable to the central processing unit (CPU) which serves as the device body.

In the meanwhile, the cooling type bushing device 10 is also employed not only to cool the device body but also to pre-heat the device body. By way of example, a certain amount of hot water (e.g., 100° C.) may be circulated within the cooling type bushing device 10.

The metal die categorically includes a molten-metal cooling pin (equivalent to the prior art outer cylinder) which comes in direct contact with the molten metal.

The cooling pin has a cooling path and constitutes a part of the metal die when used to the die-casting procedure. The cooling type bushing device 10 may be inserted into the cooling path of the cooling pin.

The metal die includes a molten-metal pouring device placed on a stationary side of the metal die and a sub-flowing device placed on a movable side of the metal die. Namely, the bushing device may be inserted into a cooling passage provided on the metal die or the sub-flowing device.

In the molten-metal pouring device which is subjected to an abrupt temperature rise (thermal fluctuation), and the cooling hole 82 is obturated with the cooling type bushing 14 by means of a lid, it is preferable to employ the cooling type bushing 14 in which the cylindrical body 16 and the flange portion 18 are integrally bonded by means of the welding procedure or the like.

It is to be noted that a gradient of the tapered surface 12D may be changed to any desired degrees (e.g., 1/150) depending on usage. The collar 12 may be divided into a plurality of collar pieces (e.g., 3-4 pieces) other than the two collar pieces 12A, 12B.

The cooling type bushing 14 may be completely mounted on the cooling hole 82 at any position in which the flange portion 18 meshes the male thread portion 20 with the female thread portion 83. At the same time, the provisional welding may be used to prevent the flange portion 18 from being loosened. The water heat-exchanged at the cooling type bushing device 10 may be cooled down to reuse as a circulation system.

The collar 12 may be cast by means of the sintering procedure with the copper powder (granulated copper) heated within a die. The flange portion 18 may be formed integral with the cylindrical body 16 to produce the cooling type bushing 14.

The tapered surface 12D of the collar 12 and the tapered surface 16B of the cylindrical body 16 may be formed straight. In this case, the clearances are loaded with the metallic fibers 60 or metallic paste 62.

Among the preceding embodiment and the modification forms A-K thus far mentioned, two or more examples may be combined.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

What is claimed is:

1. A bushing device in which a bushing is provided on a device body to be in communication with a water-communicating hole so that an aqueous medium is supplied to said bushing;
   said bushing device comprising;
   a first semi-spherical portion provided at a bottom of said water-communicating hole;
   said bushing having a bottom-ended cylindrical body and a second semi-spherical portion corresponding to said first semi-spherical portion of said water-communicating hole;
   a bushing collar placed between said bushing and an inner wall of said water-communicating hole, a diametrical dimension of said bushing collar being arranged to be identical to a diameter of said water-communicating hole when said bushing is secured to said water-communicating hole; and said bushing collar having a third semi-spherical portion in conformity with said first semi-spherical portion of said water-communicating hole; and
   wherein said bushing has a tapered outer surface and said bushing collar has a tapered inner surface in accordance with said tapered outer surface of the said bushing, and when said bushing is inserted into said water-communicating hole, said tapered outer surface of said bushing engages with said tapered inner surface of said bushing collar while being guided by said tapered inner surface of said bushing collar, so that said bushing pushes said bushing collar tightly against the inner wall of said water-communicating hole.

2. The bushing device according to claim 1, wherein said bushing collar is made of a material which is higher than a ferrous steel metal in both thermal conductivity and ductility.

3. The bushing device according to claim 2, wherein said bushing collar is divided into a plurality of collar parts cut along a longitudinal direction.

4. The bushing device according to claim 2, wherein said bushing collar is formed to have notched portions extended from a basal portion to a proximity of a front end portion of said bushing collar, and said front end portion is formed into a thinned or notched configuration.

5. The bushing device according to claim 2, wherein said bushing has a cylindrical body and a flange portion, the latter of which is secured to an open-ended portion of said cylindrical body by means of a welding procedure.

6. The bushing device according to claim 2, wherein said bushing has a cylindrical body and a flange portion, the latter of which is removably mounted on an open-ended portion of said cylindrical body.

7. The bushing device according to claim 1, wherein said bushing collar is divided into a plurality of collar parts cut along a longitudinal direction.

8. The bushing device according to claim 7, wherein said bushing collar is formed to have notched portions extended from a basal portion to a proximity of a front end portion of said bushing collar, and said front end portion is formed into a thinned or notched configuration.

9. The bushing device according to claim 7, wherein said bushing has a cylindrical body and a flange portion, the latter of which is secured to an open-ended portion of said cylindrical body by means of a welding procedure.

10. The bushing device according to claim 7, wherein said bushing has a cylindrical body and a flange portion, the latter of which is removably mounted on an open-ended portion of said cylindrical body.

11. The bushing device according to claim 1, wherein said bushing collar is formed to have notched portions extended from a basal portion to a proximity of a front end portion of said bushing collar, and said front end portion is formed into a thinned or notched configuration.

12. The bushing device according to claim 11, wherein said bushing has a cylindrical body and a flange portion, the latter of which is secured to an open-ended portion of said cylindrical body by means of a welding procedure.

13. The bushing device according to claim 1, wherein said bushing has a cylindrical body and a flange portion, the latter of which is secured to an open-ended portion of said cylindrical body by means of a welding procedure.

14. The bushing device according to claim 1, wherein said bushing has a cylindrical body and a flange portion, the latter of which is removably mounted on an open-ended portion of said cylindrical body.

15. The bushing device according to claim 14, wherein a hook portion is mounted on said open-ended portion of said cylindrical body.

16. The bushing device according to claim 1, wherein a deformable filler is provided between said bushing and said inner wall of said water-communicating hole.

* * * * *